L. E. HARDING.
MOTOR VEHICLE JACK.
APPLICATION FILED MAY 20, 1916.

1,307,859.

Patented June 24, 1919.
3 SHEETS—SHEET 1.

INVENTOR: L. E. HARDING,
BY Milton S. Crandall, ATTORNEY.

L. E. HARDING.
MOTOR VEHICLE JACK.
APPLICATION FILED MAY 20, 1916.

1,307,859.

Patented June 24, 1919.
3 SHEETS—SHEET 2.

INVENTOR.
L. E. HARDING
BY Milton S. Crandall.
ATTORNEY

L. E. HARDING.
MOTOR VEHICLE JACK.
APPLICATION FILED MAY 20, 1916.
1,307,859.
Patented June 24, 1919.
3 SHEETS—SHEET 3.
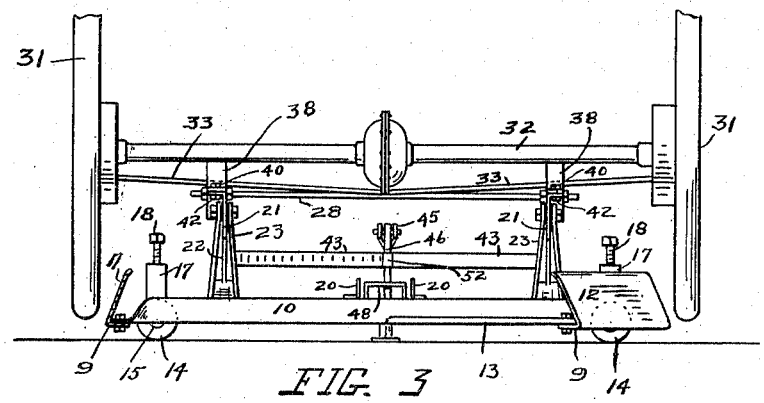
FIG. 3
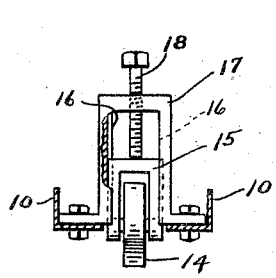
FIG. 4
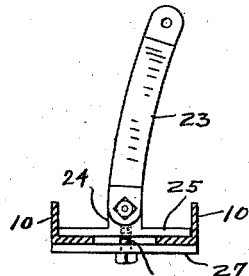
FIG. 5
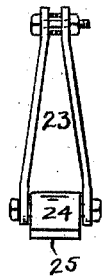
FIG. 6
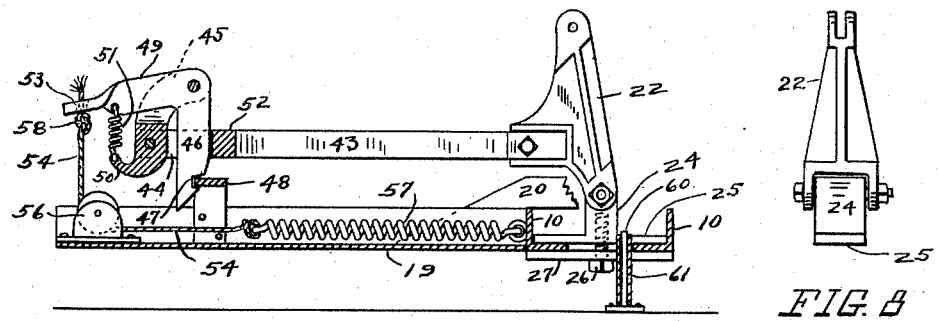
FIG. 7
FIG. 8
INVENTOR.
L. E. HARDING
BY Milton S. Crandall,
ATTORNEY

UNITED STATES PATENT OFFICE.

LESTER E. HARDING, OF SIOUX CITY, IOWA, ASSIGNOR OF THREE-FOURTHS TO HENRY SCHMITT, JR., OF SIOUX CITY, IOWA.

MOTOR-VEHICLE JACK.

1,307,859.      Specification of Letters Patent.      Patented June 24, 1919.

Application filed May 20, 1916. Serial No. 98,791.

*To all whom it may concern:*

Be it known that I, LESTER E. HARDING, a citizen of the United States, and a resident of Sioux City, in the county of Woodbury and the State of Iowa, have invented certain new and useful Improvements in Motor-Vehicle Jacks, of which the following is a specification.

The present invention relates to vehicle-jacks, and more particularly to jacks for motor-vehicles.

The invention has for its primary object, the production of an improved motor-vehicle-jack actuated by movement of the vehicle to raise the vehicle clear of the floor.

Another object of the invention is the production of an automatic vehicle-jack embodying certain novel features adapting it for use with practically any type or size of automobile.

A further object of the invention is the production of a motor-vehicle-jack embodying certain novel features of construction whereby the vehicle is raised by a comparatively slight impact of the vehicle with the jack, is securely held in raised position, and is conveniently lowered.

A still further object of the invention is the production of an automatic vehicle-jack inexpensive in production and highly efficient in operation.

With these and other objects in view, the invention, consisting in the construction, combination and novel arrangement of parts, will be fully understood from the following description, reference being had to the accompanying drawings, which form a part of this application, and in which like characters of reference indicate corresponding parts throughout the several views, of which,—

Figure 1:
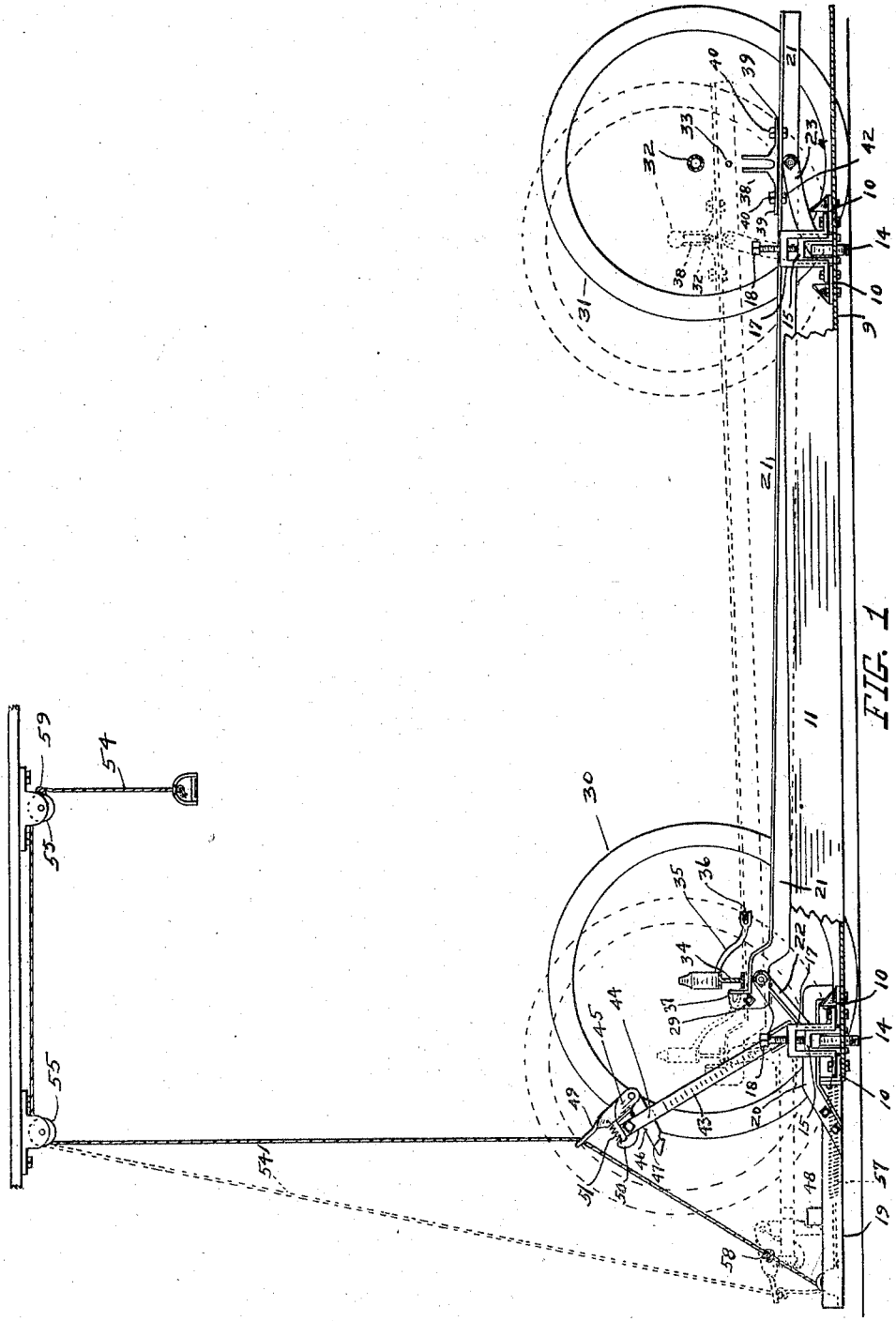
Figure 2:
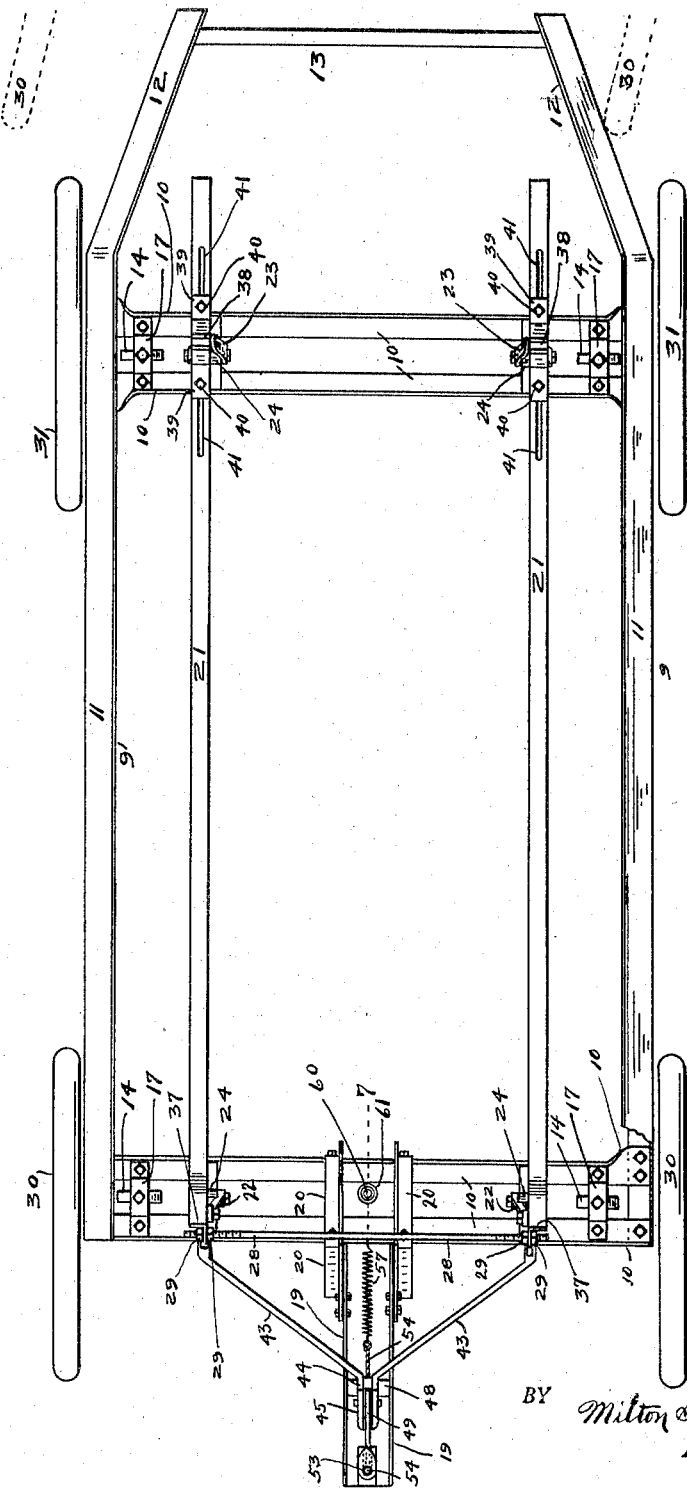

Figure 1 is a side elevation of a device constructed in accordance with the invention, portions being cut away; Fig. 2 is a plan of the same; Fig. 3 is a rear elevation of the same, shown as supporting a vehicle, and with parts cut away; Fig. 4 is a side elevation of one of the rollers, a part being cut away and shown in section; Fig. 5 is a side elevation of one of the rear lifting members; Fig. 6 is a rear elevation of the same; Fig. 7 is an enlarged vertical section of the forward portion of the device taken on the line 7, of Fig. 2; and Fig. 8, is a rear elevation of one of the front lifting members.

Although I have illustrated and hereinafter described the preferred embodiment of the invention, I would not be understood as being limited to the specific structure chosen for illustration, for various alterations in the details of construction and arrangement of parts may be made without departing from the spirit and scope of the invention as defined in the appended claims.

Referring now, to the illustration, the main-frame of the device includes parallel side members, 9, interconnected by front and rear cross-members, 10.

The side members are formed with inwardly-inclined flanges 11, and the rear ends of said members are bent inwardly, as at 12, to serve as guides for centering the device beneath the vehicle, as will be presently made more clear; and the extreme rear ends thereof are interconnected by a cross-brace, 13.

The front and rear cross-members each comprise a pair of oppositely disposed angle-irons, each arranged in parallel and spaced relation to its mate.

The main frame is carried upon transverse rollers, 14, positioned between the respective pairs of cross-members and adjacent the ends thereof. The main frame is vertically adjustable upon the rollers, each roller being carried by a yoke, 15, the arms of which are slidably-inclosed within grooves, 16, (Fig. 4) in the arms of a second yoke, 17, mounted on the cross-members. A spacing-screw, 18, threaded through the web of the yoke, 17, and into engagement with the other yoke, affords means for adjusting the frame vertically.

A channel-iron arm, 19, extends forwardly from the center of the main-frame, and is rigidly secured thereto by suitable braces, 20, secured to the flanges of the arm and cross members, 10.

The main frame supports a pair of vertically movable longitudinally-disposed beams, 21, each pivoted upon front and rear arms, 22, and 23, respectively, pivoted to rock vertically upon suitable bearings, 24, mounted on the main-frame.

The bearings, 24, are preferably adjustable transversely of the main-frame, each bearing having a base, 25, which rests upon the horizontal flanges of the cross-members, 10, and is clamped thereto by a screw, 26, passing through a plate, 27, embracing the under sides of the cross-members; and threaded into the bearings, as clearly shown in Figs. 5 and 7.

The forward ends of the beams are interconnected by a tie-rod, 28, the end portions of which pass through the beams, and have nuts, 29, threaded on the rod, and into engagement with the opposite sides of the beams.

The rock-arms, 22 and 23 are normally rearwardly inclined, the latter arms being relatively longer and rearwardly inclined, more than their companions, whereby the rear ends of the beams are normally quite lower than the front ends thereof.

Referring now more particularly to Figs. 1 and 3, 30 and 31, represent respectively the front and rear wheels of an automobile chassis; 32 represents the rear axle; 33, the rear truss-rod; 34 the front axle, 35, the steering-knuckle arms; and 36, the tie-rod which interconnect the steering-knuckle arms.

The front ends of the beams are upturned, as at 37, or provided with other suitable stops to receive the impact of the front axle when the automobile moves forwardly astride the device; and upon the rear portions of the beams are mounted bifurcated uprights, suitable to freely pass the truss-rod and engage and lift the rear axle when the beams are raised.

In the embodiment chosen for illustration, the said bifurcated uprights comprise U-shaped members 38, having horizontal flanges 39, which rest upon the beams, and are suitably secured thereto to permit of their being adjusted longitudinally of the beams, as by bolts, 40, which pass through the flanges and longitudinal slots, 41, in the beams, the said bolts being provided with nuts, 42, which engage the under sides of the beams, and thus securely clamp the uprights to the beams.

To the front rock-arms are secured forwardly disposed arms, 43, which extend upwardly when the jack is in its normal, or lowered position. The said arms are bent inwardly toward each other, and their free end portions are disposed in parallel and spaced relation to each other as at 44.

Between the end portions 44, of the arms, 43, is bolted a suitable bearing, 45, to which is fulcrumed a bell-crank, one arm of which, 46, depends between the portions, 44, and is provided with a notch, 47, engageable with cross-member, 48, secured between the flanges of the channel-iron, 19, to lock the jack in its raised position, as will hereinafter be more fully described.

Between the other arm, 49, of the bell-crank, and the ear, 50, on the bearing, 45, is interposed a retracting-spring, 51, which serves to hold the latch-arm, 46, yieldably against a suitable stop, as the block, 52, interposed between the end portions of the arms, 43.

The bell-crank arm, 49, is formed with an eye, 53, which freely incloses a cable, or other flexible strand, 54, which passes over direction pulleys, 55, secured to the garage ceiling, or other suitable point. The lower portion of the cable passes around a direction pulley, 56, mounted on the channel-iron arm; and is secured to one end of a retracting spring, 57, the other end of which is secured to the foremost cross member, 10. Below the bell-crank eye, the cable is provided with a knot, 58, or other suitable stop, to engage the eye. The upper end of the cable may be provided with a D-handle, for conveniently pulling the cable, and knotted, as at 59, to prevent retraction of the cable beyond a predetermined point.

Intermediate the foremost cross-members, 10, is interposed a post, 60, mounted on the floor and encircled by a friction-roller, 61, engageable by the rearmost of the said cross-members, to prevent forward movement of the main-frame, and yet permit lateral movement thereof.

In adjusting the structure, now disclosed, to an automobile, the beams 21, may be adjusted toward or from each other, by accordingly moving the bearings, 24, whereby the lifting members of the jack may be placed in position to engage the axles of the vehicle and not encounter oil-cups, brake-rods, and other attachments on the chassis.

Obviously, when thus adjusting the beams, the arms, 43, may be bent to permit the adjustment.

The main-frame is adjusted to its proper height, with respect to the vehicle, through the medium of the screws, 18, as previously described.

With the front axle positioned adjacent the axle-stops, 37, the rear axle supports are adjusted to positions directly below the rear axle.

In driving over the jack, should the front wheels approach the jack at an angle, as indicated in dotted lines in Fig. 2; or should the approaching vehicle not be alined with the jack, the engagement of the wheels with the diverging ends of the guides, 9, will force the jack laterally to its proper position centrally of the path of the vehicle.

The rear axle-supports are positioned sufficiently low to permit the free passage thereover of the front axle, the steering knuckle tie-rod, and the other parts of the chassis which are usually mounted quite low.

As the vehicle moves forwardly, the impact of the front-axle with the stops, 37, causes the rock-arms and beams to swing forwardly and upwardly, thus raising the chassis to the position shown in Fig. 3, and in dotted lines in Fig. 1.

It will be observed that in raising, the forward rock-arms pass to the front of their fulcrums, by virtue of which, the weight of the front of the chassis aids in raising the rear thereof; and when in raised position the rear rock-arms stand slightly to the rear of their fulcrums, whereby the rear weight of the vehicle aids dismounting from the jack.

Coincident with the raising of the machine, the lever arms, 43, swing downwardly and the latch, 46, engages the catch, 48, to prevent rearward, or further forward movement of the rock-arms.

To dismount the vehicle, a slight downward pull on the handle of the cable, causes the stop, 58, to engage the latch-lever and disengage the latch; and upon further traction on the cable, the lever arms, 43, are lifted sufficiently to swing the front rock-arms to the rear of their pivots, whereupon the vehicle will drop to the floor, and the jack members assume their normal position.

The portions of the beams which support the front axles are preferably higher than the portions immediately in the rear thereof, in order to afford ample clearance for the steering-knuckle tie-rod, which in many instances is lower than the axle.

I am aware that vehicle-jacks actuated by impact by a vehicle therewith, have been heretofore known, and I do not claim such structure broadly, but what I do claim as new and desire to secure by Letters Patent of the United States, is:—

1. In a vehicle-jack, the combination with a base frame, and vehicle-supporting means including front and rear rock-arms pivoted on the frame to swing vertically and normally rearwardly inclined, of arms rigidly secured to the front rock-arms and normally extending upwardly, and latch mechanism to prevent retrograde movement of the rock-arms when swung upwardly, including a bell-crank so pivoted to said second arms that one arm thereof depends and the other extends forwardly, and a member carried by the base releasably engageable by the depending arm, and an element to coact with the forwardly extending bell-crank arm to release the depending arm and lift said second arms.

2. In a vehicle-jack, the combination with a base frame, and vehicle-supporting means including front and rear rock-arms pivoted on the frame to swing vertically and normally rearwardly inclined, of arms rigidly secured to the front rock-arms and normally extending upwardly, and latch mechanism to prevent retrograde movement of the rock-arms when swung upwardly, including a bell-crank so pivoted to said second arms that one arm thereof depends and the other extends forwardly, and a member carried by the base releasably engageable by the depending arm, and an element retractably secured to the base frame, extended upwardly and engageable with the forwardly-extending bell-crank arm to release the depending arm and lift said second arms.

In testimony whereof I have hereunto set my hand this 17th day of May, 1916.

LESTER E. HARDING.